United States Patent
Tjon et al.

(10) Patent No.: US 7,503,720 B2
(45) Date of Patent: Mar. 17, 2009

(54) HINGE BRACKET HOLDER

(75) Inventors: Robert Tjon, Leiderdorp (NL); Stephan Roepke, Wismar (DE)

(73) Assignee: Airbus Deutschland GmbH (DE)

( * ) Notice: Subject to any disclaimer, the term of this patent is extended or adjusted under 35 U.S.C. 154(b) by 197 days.

(21) Appl. No.: 11/169,937

(22) Filed: Jun. 29, 2005

(65) Prior Publication Data
US 2006/0088376 A1    Apr. 27, 2006

Related U.S. Application Data

(60) Provisional application No. 60/585,426, filed on Jul. 2, 2004.

(30) Foreign Application Priority Data

Jul. 2, 2004    (EP)    ................................ 04015665

(51) Int. Cl.
*F16B 21/06*    (2006.01)
(52) U.S. Cl. ...................... 403/322.1; 403/11; 403/321; 244/118.5; 248/231.51
(58) Field of Classification Search ...................... 403/3, 403/4, 10, 11, 321, 322.1; 244/118.5; 52/506.05, 52/39, 28; 296/37.8; 248/231.51, 228.4
See application file for complete search history.

(56) References Cited

U.S. PATENT DOCUMENTS

| | | | | |
|---|---|---|---|---|
| 2,904,141 A | * | 9/1959 | Henrichs | .................... 403/321 |
| 4,490,883 A | | 1/1985 | Gauron | .......................... 16/245 |
| 4,632,588 A | * | 12/1986 | Fitzpatrick | ................... 403/321 |
| 5,620,212 A | * | 4/1997 | Bourne et al. | ................ 292/113 |
| 6,431,585 B1 | | 8/2002 | Rickabus et al. | .......... 280/728.3 |
| 7,114,221 B2 | * | 10/2006 | Gibbons et al. | ................ 24/289 |
| 2003/0190846 A1 | | 10/2003 | Costa | .......................... 439/845 |

FOREIGN PATENT DOCUMENTS

GB    2 211 240 A    6/1989

OTHER PUBLICATIONS

Airbus, ABS1002, Issue 1, "Aerospace series Damper", (Dec. 2002) Copyright Airbus S.A.S 2002; and ABS1003, Issue 2, "Aerospace series Ceiling panel holder" Copyright Airbus S.A.S 2003; and ABS0799, ABS0798; Published by Airbus S.A.S., France.
European Search Report, dated Dec. 20, 2004, 2 pages.

* cited by examiner

*Primary Examiner*—Michael P Ferguson
(74) *Attorney, Agent, or Firm*—Ostrolenk, Faber, Gerb & Soffen, LLP

(57) ABSTRACT

A holder for a panel, such as a light cover in an aircraft, is provided. A mounting section, a shoe receiving section and a pin provide a pin and shoe operation, such that a shoe is slideable onto the shoe receiving section in an open position of the holder, and such that the mounting section and the shoe receiving section are attached to each other by the pin in a closed position for securing the shoe in the holder. A recess or aperture is positioned in the shoe receiving section to receive the pin.

4 Claims, 4 Drawing Sheets

HINGE BRACKET HOLDER

REFERENCE TO RELATED APPLICATIONS

This application claims the benefit of the filing date of U.S. Provisional Patent Application No. 60/585,426, filed Jul. 2, 2004, and of European Patent Application No. 04 015 665.5, filed Jul. 2, 2004, the disclosure of which is hereby incorporated by reference.

FIELD OF THE INVENTION

The present invention relates to a holder, for example, for a panel in an aircraft. In particular, the holder may be adapted for attaching a light cover to a structure in an aircraft. Furthermore, the present invention relates to a method of attaching a panel to a structure of an aircraft.

BACKGROUND OF THE INVENTION

It is known to attach panels to structures of an aircraft with screw-like elements. However, there is a problem that loose elements, such as the screw-like elements may be lost during assembly which may require an extensive search since such loose elements may not be left on aircraft before it gets into service.

SUMMARY OF THE INVENTION

The present invention relates to a holder, in particular for a light cover in an aircraft for attaching the light cover to a structure of the aircraft. According to an aspect of the present invention, the holder achieves the attachment of the light cover to the structure of the aircraft by a pin and shoe principle. A mounting section which may be attached to the structure of the aircraft may be provided which according to a further aspect of the present invention may be attached by a pin to a shoe receiving section. In an open position of the holder, a shoe which may be attached to the light cover may be slid into or onto the shoe receiving section. Then, by rotating the receiving section, the holder may be closed. This closed position may be secured by a pin which, when the shoe receiving section is rotated, goes into engagement with a corresponding closure element such that the shoe receiving section and the mounting section are attached to each other in the closed position.

In the following, exemplary embodiments of the present invention will be described with reference to the following Figures.

DESCRIPTION OF PREFERRED EMBODIMENTS OF THE INVENTION

Figure 1:
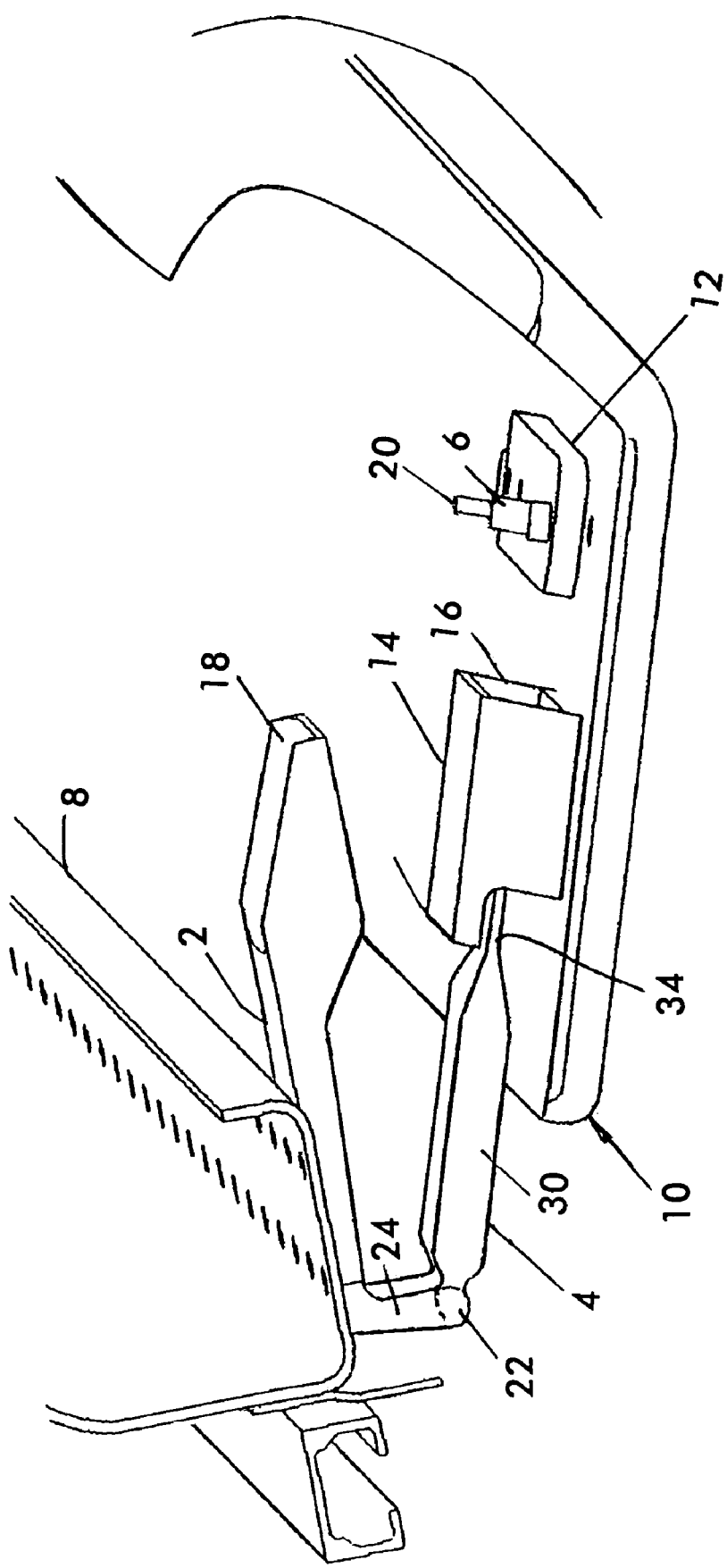
FIG. 1 shows a three-dimensional representation of a first exemplary embodiment of a holder according to the present invention in an open position.

In the following description of exemplary embodiments of the present invention relating to FIGS. 1-5, the same reference numerals are used for the same or corresponding elements.

FIG. 1 shows a three-dimensional representation of a first exemplary embodiment of a holder according to the present invention in an open position. In the following description, the holder is described with respect to a holder for mounting a light cover to a structure of an aircraft. It should, however, be noted that the holder is not limited to these exemplary embodiments and may be applied in different fields such as, for example, in motor vehicles or in building applications.

Reference numeral 2 in FIG. 1 designates a mounting bracket which is adapted for attachment to a structure 8 of the aircraft. The mounting bracket may screwed, clipped or glued to the aircraft structure 8 or may be attached to the aircraft structure 8 by any other suitable attachment method. The mounting bracket is provided with a cut-out 18 for accommodating a closure element (not shown in FIG. 1) for an engagement with a head 20 of a pin 6. A pin mount 12 may be provided for mounting or attaching the pin 6 to a light cover 10. According to an aspect of this exemplary embodiment of the present invention, the pin 6 may be a stud pressure fastener, such as, for example, described in the Airbus publication reference no. ABS0799 which is hereby incorporated by reference.

The mounting bracket 2 is furthermore provided with a connector element 24 which, as may be taken from FIG. 1, extends essentially perpendicular to a main portion of the mounting bracket 2, for example to the portion of the mounting bracket 2 which is attached to the structure of the aircraft 8. At an end of the connector element 24 facing away from the aircraft structure 8 or the main portion of the mounting bracket 2, there is provided a hinge 22 for connecting the mounting bracket 2 to a shoe bracket 4. As may be taken from FIG. 1, the mounting bracket 2 including the connector element 24 may essentially have an L-form. The shoe bracket 4 may essentially have the form of a bar having a tapered end 34 which may be referred to as threading or fork section. Furthermore, between the fork section 34 and the other end of the shoe bracket 4 which is attached to the hinge 22, there is provided a shoe mount section 30.

Reference numeral 14 designates a shoe which is adapted for attachment to the light cover 10. The shoe may be attached to the light cover 10 by a suitable sliding and/or clipping attachment. However, it may also be glued or screwed or bolted to the light cover 10. The shoe 14 is provided with a shoe aperture 16. The shoe aperture 16 may be a hole but may also have an almost cross-sectional section as indicated in FIG. 1. Dimensions of the aperture 16 are adapted to dimensions of the shoe mount section 30, such that the shoe 14 may be slid into/or onto the shoe mount section 30 of the shoe bracket 4. According to an aspect of this exemplary embodiment, the shoe 14 may be provided with a nose 26, which, when the shoe is slid onto the shoe mount section 30, abuts to the connector element 24. By this, a position of the shoe and/or the light cover 10 with respect to the mounting bracket 2 or the structure 8 may be ensured. This may facilitate an alignment of the light cover 10 during assembly.

The hinge 22 may be realized by using a rotational axis. However, the hinge 22 may be also be realized by a suitable elastic connection between the mounting bracket 2 and the shoe bracket 4. Such a connection may be made of plastics.

FIG. 1 shows the holder according to this exemplary embodiment of the present invention in an open position where the shoe 14 attached to the light cover 10 can be slid onto the shoe bracket 4 which is facilitated by the threading section 34 and may then be slid onto the shoe mount section 30 of the shoe bracket 4.

Figure 2:
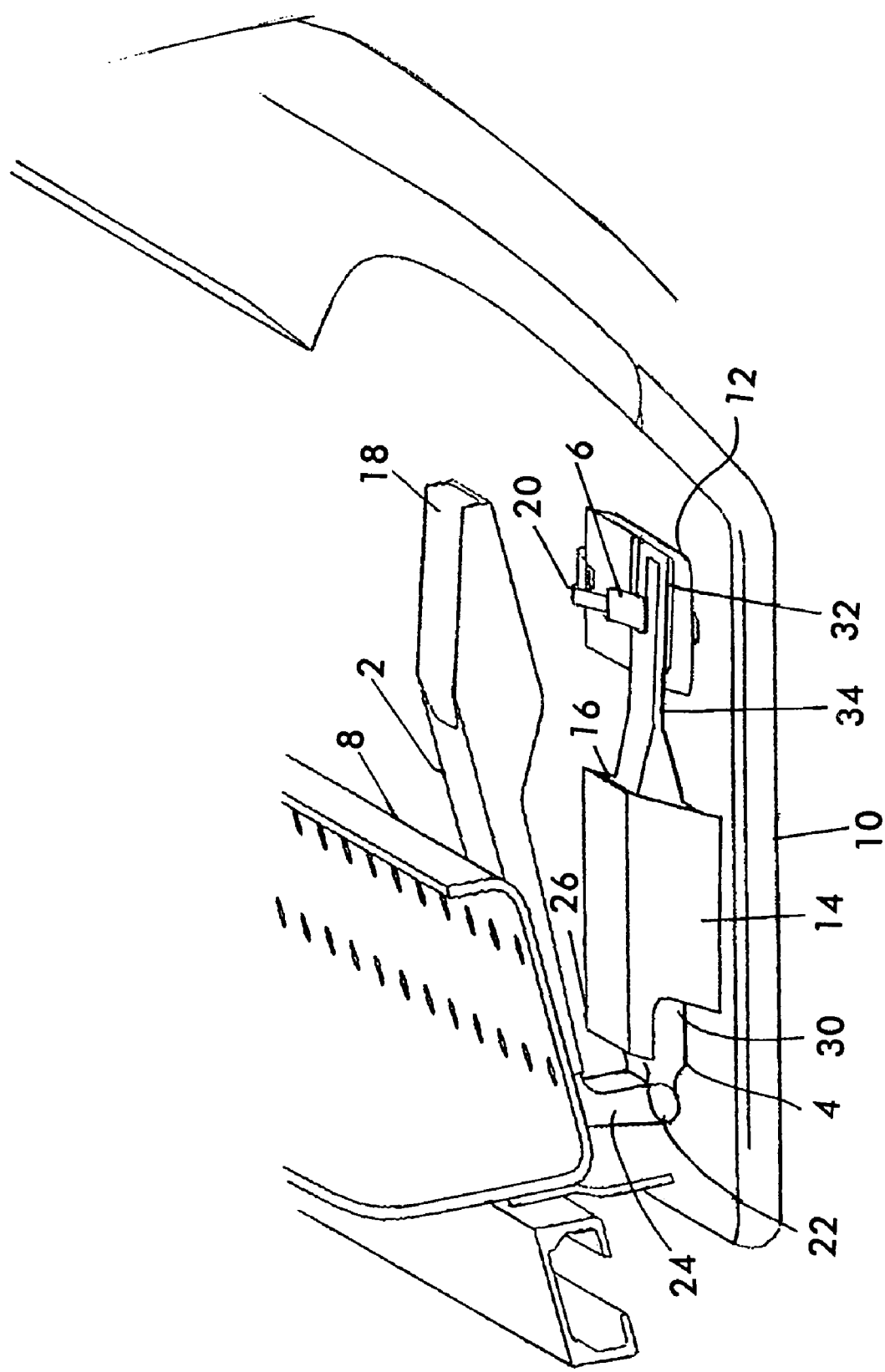
FIG. 2 shows another three-dimensional representation of the holder of FIG. 1 in a position between the open position and a closed position.
Figure 3:
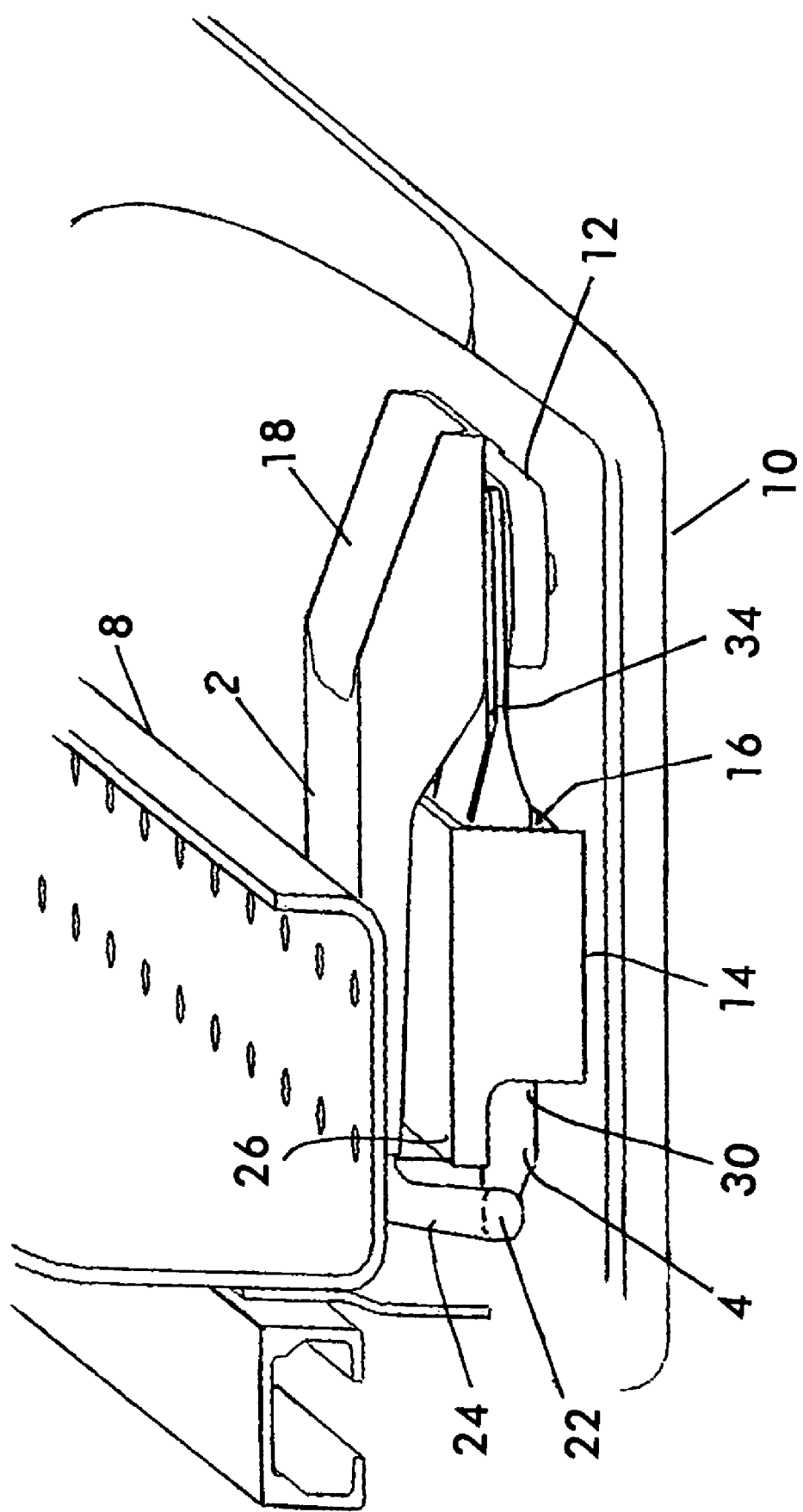
FIG. 3 shows another three-dimensional representation of the holder of FIG. 2 in the closed position.

FIG. 2 shows another three-dimensional representation of the holder of FIG. 1 in a position between the open position of FIG. 1 and a closed position which is shown in FIG. 3. As may be taken from FIG. 2, the threading section 34 is provided with a recess 32 for receiving the pin 6. This may allow for a simple alignment of the pin 6 with the holder. In particular, this may facilitate an alignment of the pin 6 with the pin bracket (not shown in FIG. 2) accommodated in the cut-out 18 of the mounting bracket 2. As pin bracket, for example, a pin cushion, such as disclosed in Airbus publication reference no. ABS0794 may be used, which is hereby incorporated by reference.

As indicated with reference to FIG. 1, the shoe 14 may be provided with a nose 26 for guiding the shoe bracket 4. However, as may be taken from FIG. 2, the alignment of the pin and/or the light cover 10 with respect to the holder and/or the structure 8 of the aircraft may also be realized by the pin 6 and the recess 32 in the fork section 34 of the shoe bracket 4. Thus, it should be noted that the nose 26 may be used for guiding the shoe bracket 4. However, the nose 26 may be optional.

FIG. 3 shows another three-dimensional representation of the holder of FIG. 1 in the closed position. As may be taken from FIG. 3, the main portions of the mounting bracket 2 and the shoe bracket 4 extend essentially parallel to each other. The pin 6 which is attached to the light cover 10 by means of the pin mount 12 extends through the recess 32 in the fork section 34 and is in engagement with the pin bracket (not shown in FIG. 3) accommodated in the cut-out 18 of the mounting bracket 2. The light cover 10 is secured to the structure 8 of the aircraft by means of the shoe 14, the pin 6, the mounting bracket 2 and the shoe bracket 4 interacting with each other.

In the following, a function and a method of operating the holder depicted in FIGS. 1-3 is described with reference to FIGS. 1-3.

As may be taken from FIG. 1, after attachment of the mounting bracket 2 to the structure 8 and of the shoe 14 and the pin 6 to the light cover 10, the fork section 34 is thread into the aperture 16 of the shoe 14. Then, the light cover 10 and therewith the shoe 14 is moved essentially towards a rotational axis of the hinge 22 whereby the shoe 14 is slid onto the shoe mount section 30 of the shoe bracket 4. The shoe 14 is slid onto the show mount section 30 until the pin 6 abuts to the end of the recess 32 in the fork section 34. This is depicted in FIG. 2. Then, the holder may be closed by rotating the shoe bracket 4 and/or the light cover 10 around the rotational axis of the hinge 22. When the pin 6 is in engagement with the corresponding pin bracket (not shown in FIGS. 1-3) accommodated in the cut-out 18, the holder is in the closed position and the light cover 10 is affixed to the structure 8.

Advantageously, a very small holder may be provided which may be accommodated in a very narrow space. Furthermore, due to the fact that no loose elements are required during assembly, it may be avoided that loose elements are lost during assembly. Furthermore, the holder according to the present invention may allow for a very simple and fast assembly since the shoe may easily be slid into/onto the shoe bracket 4 and then attached by clicking the pin in the pin bracket. To release the light cover, the pin may just be released from the pin bracket. Then, the shoe bracket may be hinged down and the light cover may be slid off the shoe bracket 4. Furthermore, due to the fact that the light cover is attached at a plurality of points, a bending of the light cover due to its own weight may be avoided.

Figure 4:
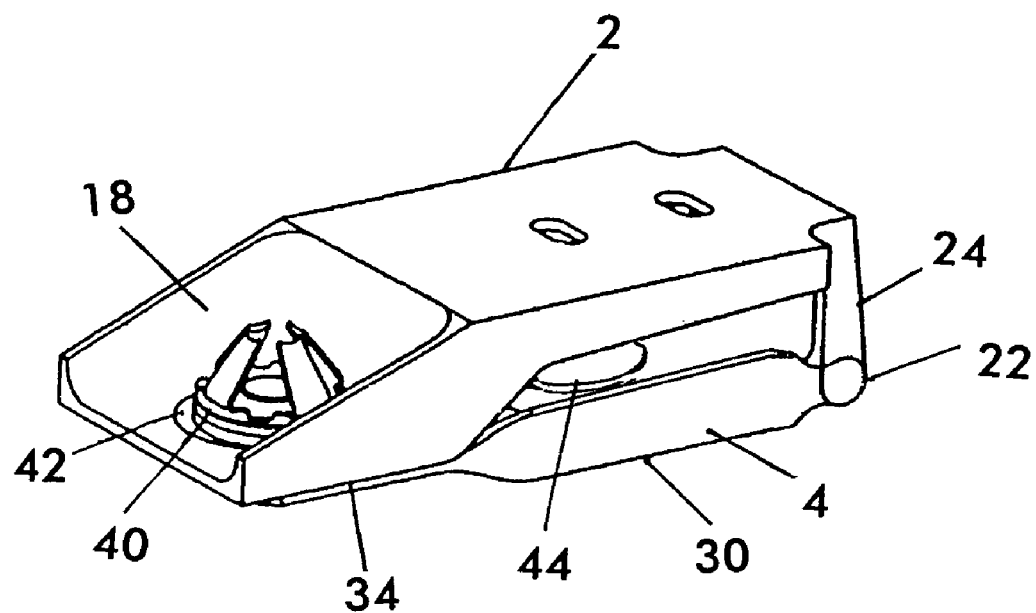
FIG. 4 shows another three-dimensional representation of a second exemplary embodiment of a holder according to the present invention.

FIG. 4 shows another three-dimensional representation of a second exemplary embodiment of a holder according to the present invention. As may be taken from FIG. 4, a pin bracket 40 may be provided in the cut-out 18 of the mounting bracket 2. The pin bracket may be made of metal and comprise four inwardly bent springs for securing the head 20 of the pin 6. As pin bracket 40, the pin bracket as described in Airbus publication reference no. ABS0798, which is hereby incorporated by reference, may be used. The pin bracket 40 may be attached to the mounting bracket 2 by means of a pin bracket mount 42 which may be accommodated in a hole in the mounting bracket 2. The pin bracket mount may be a damper as, for example, described in Airbus publication ABS1002 which is hereby incorporated by reference.

Furthermore, there are may be provided another damper 46 which is accommodated in the hole in the shoe bracket 4. This damper 46 may be used in combination with plungers 44 to attach the shoe bracket 4 to other elements.

Figure 5:
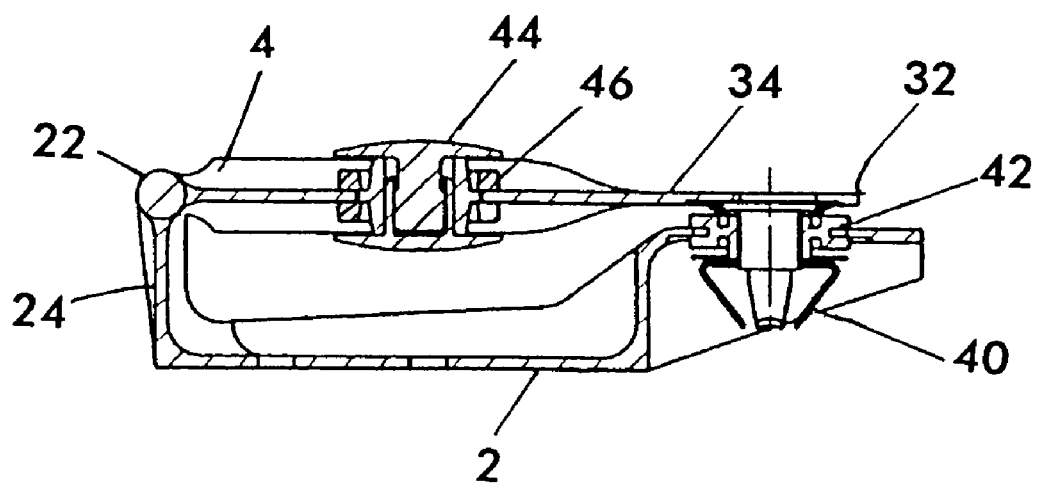
FIG. 5 shows a cross-sectional view of the holder of FIG. 4.

FIG. 5 shows a longitudinal cross-sectional view of the holder of FIG. 4. As may be taken from FIG. 5, the pin bracket mount is provided with a hole in the metal such that the head 20 of the pin 6 may be inserted into the hole and may then go into engagement with the springs of the pin bracket 40.

Advantageously, the above described exemplary embodiments of the holder according to the present invention may allow for a facilitated assembly and deassembly of the light cover to a structure of the aircraft. The mounting bracket 2 and the shoe bracket 4 may be made of any suitable plastic or metal.

It should be noted, that the term "comprising" does not exclude other elements or steps and the "a" or "an" does not exclude a plurality and that a single processor or system may fulfill the functions of several means recited in the claims. Also elements described in association with different embodiments may be combined.

It should also be noted, that any reference signs in the claims shall not be construed as limiting the scope of the claims.

What is claimed is:

1. A holder and a panel in an aircraft, the holder for securing the panel to a structure attached to the holder, the holder comprising:

an elongated mounting section having a first end and a second end;

a pin bracket positioned on the second end and comprising a pin aperture for receiving a pin;

an elongated shoe receiving section having a third end and a fourth end;

a hinge pivotally connecting the first end and the third end;

the panel including a pin protruding from the panel and configured to be engageable with the pin aperture in the pin bracket;

the hinge configured to pivot between an open position and a closed position, and positioned and configured to fixedly connect in the closed position the second end and the fourth end, wherein in the open position, the mounting section freely pivots relative to the shoe receiving section, and wherein in the closed position, the mounting section and the shoe receiving section are fixedly connected to one another;

a longitudinally extending slot positioned in the fourth end, the slot configured to receive the pin such that when the holder is in the closed position, a first side of the pin adjacent the panel is slidably received in the slot and a second side of the pin is in engagement with the pin aperture in the pin bracket; and the panel further including a shoe positioned on the panel, the shoe comprising a shoe aperture positioned and configured such that the shoe is slideable onto the shoe receiving section by passing the shoe receiving section longitudinally through the shoe aperture, wherein when the holder is in the open position, the shoe receiving section is slideable longitudinally through the shoe aperture in the shoe such that the pin is received in the slot, and wherein when the holder is in the closed position, the shoe is secured on the holder on the shoe receiving section between the hinge and the pin such that the pin and the pin bracket are in engagement with each other.

2. The holder and the panel of claim 1, wherein the pin and the pin bracket are positioned and configured to be detachably connectable to each other.

3. The holder and the panel of claim 1, wherein the panel comprises a light cover in a pressure cabin of an aircraft and the holder is operable to secure the panel to a structure of the aircraft.

4. A holder and panel system in an aircraft, the holder for securing the panel to an aircraft structure and configured to interact with a shoe and a pin protruding from the panel, the system comprising:

the holder, which comprises:

an elongated mounting section having a first end and a second end;

a pin bracket positioned on the second end and comprising a pin aperture for receiving a pin;

an elongated shoe receiving section having a third end and a fourth end;

a hinge pivotally connecting the first end and the third end, configured to pivot between an open position and a closed position, and positioned and configured to fixedly connect in the closed position the second end and the fourth end, wherein in the open position, the mounting section freely pivots relative to the shoe receiving section, and wherein in the closed position, the mounting section and the shoe receiving section are fixedly connected to one another;

the panel, which comprises:

a pin protruding from the panel and configured to be engageable with the pin aperture in the pin bracket; and a shoe positioned on the panel and comprising a shoe aperture positioned and configured such that the shoe is slideable onto the shoe receiving section by passing the shoe receiving section longitudinally through the shoe aperture, the shoe receiving section configured to slide longitudinally through the shoe aperture in the shoe in the open position of the holder, wherein the mounting section, the shoe receiving section and the pin are positioned and configured such that a pin and shoe operation is achieved by the sliding of the shoe on the shoe receiving section in the open position of the holder and by attachment of the mounting section and the shoe receiving section to each other by the pin in the closed position, wherein an elongated slot is positioned in the fourth end, the slot configured to have an opening on a side facing the pin to receive the pin during the sliding of the shoe on the shoe receiving section such that the pin is received within the slot, and such that when the holder is in the closed positions, a first side of the pin adjacent the panel is slidably received in the slot a second side of the pin is in engagement with the pin aperture in the pin bracket, the pin configured to attach the mounting section to the shoe receiving section when the holder is in the closed position for securing the shoe on the shoe receiving section between the hinge and the pin.

* * * * *